United States Patent
Lin et al.

(10) Patent No.: US 9,084,011 B2
(45) Date of Patent: Jul. 14, 2015

(54) METHOD FOR ADVERTISING BASED ON AUDIO/VIDEO CONTENT AND METHOD FOR CREATING AN AUDIO/VIDEO PLAYBACK APPLICATION

(71) Applicant: Chih-Yao Lin, Taipei (TW)

(72) Inventors: Chih-Yao Lin, Taipei (TW); Jiunn-Kuang Chen, Taipei (TW)

(73) Assignee: Chih-Yao Lin, Taipei (TW)

( * ) Notice: Subject to any disclaimer, the term of this patent is extended or adjusted under 35 U.S.C. 154(b) by 0 days.

(21) Appl. No.: 14/252,473

(22) Filed: Apr. 14, 2014

(65) Prior Publication Data

US 2014/0317655 A1 Oct. 23, 2014

(30) Foreign Application Priority Data

Apr. 19, 2013 (TW) .............................. 102114007 A
Dec. 26, 2013 (TW) .............................. 102148416 A

(51) Int. Cl.
| | |
|---|---|
| *H04N 7/10* | (2006.01) |
| *H04N 21/435* | (2011.01) |
| *H04N 21/81* | (2011.01) |
| *H04N 21/45* | (2011.01) |
| *G06Q 30/02* | (2012.01) |
| *H04N 21/414* | (2011.01) |
| *H04N 21/482* | (2011.01) |
| *H04N 21/61* | (2011.01) |
| *H04N 21/8545* | (2011.01) |
| *H04N 21/235* | (2011.01) |

(52) U.S. Cl.
CPC ............. *H04N 21/435* (2013.01); *G06Q 30/02* (2013.01); *H04N 21/41407* (2013.01); *H04N 21/45* (2013.01); *H04N 21/482* (2013.01); *H04N 21/6125* (2013.01); *H04N 21/6175* (2013.01); *H04N 21/812* (2013.01); *H04N 21/8545* (2013.01); *H04N 21/235* (2013.01)

(58) Field of Classification Search
CPC ..................................................... H04N 21/45
USPC ..................................................... 725/32, 34
See application file for complete search history.

(56) References Cited

U.S. PATENT DOCUMENTS

| | | | | |
|---|---|---|---|---|
| 2010/0071005 | A1* | 3/2010 | Kusunoki ........................ | 725/46 |
| 2011/0243529 | A1* | 10/2011 | Oryoji et al. .................. | 386/248 |
| 2013/0006765 | A1* | 1/2013 | Lee .............................. | 705/14.53 |
| 2013/0047178 | A1* | 2/2013 | Moon et al. ..................... | 725/25 |

* cited by examiner

*Primary Examiner* — Olugbenga Idowu
(74) *Attorney, Agent, or Firm* — Muncy, Geissler, Olds & Lowe, P.C.

(57) ABSTRACT

A method for advertising based on audio/video (AV) content is to be implemented by an electronic device and includes the steps of: receiving target information from an advertising broadcast server; accessing AV data for playback, followed by extracting a sample which corresponds to a portion of content of the AV data; comparing the sample thus extracted with the target information received from the advertising broadcast server; when the sample includes content that matches the target information, transmitting a confirmation message to the advertising broadcast server; and receiving an advertisement file corresponding to the target information and transmitted by the advertising broadcast server for playback.

3 Claims, 16 Drawing Sheets

US 9,084,011 B2

METHOD FOR ADVERTISING BASED ON AUDIO/VIDEO CONTENT AND METHOD FOR CREATING AN AUDIO/VIDEO PLAYBACK APPLICATION

CROSS-REFERENCE TO RELATED APPLICATION

This application claims priorities of Taiwanese Patent Application No. 102114007, filed on Apr. 19, 2013, and Taiwanese Patent Application No. 102148416, filed on Dec. 26, 2013.

BACKGROUND OF THE INVENTION

1. Field of the Invention

The present invention relates to a method for advertising, more particularly to a method for advertising based on audio/video content.

2. Description of the Related Art

With the rapid development of network information transmission technology, media for playback of audio/video content has gradually evolved. In the past, people are used to passively watch video programs on television (TV) broadcasted by TV stations. People nowadays have more choices, that is, they may use a desktop computer, a tablet computer, a smart phone or a smart TV to execute various kinds of playback software for searching actively videos on the Internet so as to watch the videos they are interested in at any time. In this circumstance of information communication, since it costs considerably to schedule an advertisement between TV programs, for advertisers, it is favorable to advertise audio/video playback media on the Internet.

In recent years, several techniques for advertising audio/video playback media on the Internet have been developed. A popular technique is Google InVideo advertisement which is adopted on the website YouTube. This technique provides a transparent overlay advertisement which appears at a bottom part of a YouTube video that a user is watching, such that the user may watch the video and the advertisement at the same time. When the user clicks on the transparent overlay advertisement, the video which is originally being played back is paused, and an advertisement video is played back instead.

However, the conventional techniques for advertising on audio/video playback media still focus on how the advertisement is presented, and the content of the advertisement is usually irrelevant to the content being viewed. In another technique for advertising, the advertisement to be played back is selected by means of matching between text describing the video being played back and keywords associated with the advertisement based on the advertisement keywords technique developed by Google. Nevertheless, when a video is uploaded, text to describe the video is not always inputted. Therefore, there is a chance that an advertisement does not match the content of the audio/video being played back.

SUMMARY OF THE INVENTION

Therefore, an object of the present invention is to provide a method for advertising based on audio/video content, and a method for creating an audio/video (AV) playback application (APP) program.

In a first aspect of the present invention, the method for advertising based on AV content is to be implemented by an electronic device that communicates with an advertising broadcast server. The electronic device is provided with an AV playback application program for playback of AV data. The advertising broadcast server stores at least one advertisement file and target information corresponding to the advertisement file. The method comprises the steps of:

(a) receiving, by the electronic device, the target information from the advertising broadcast server when the electronic device executes the AV playback application program to notify the advertising broadcast server for transmission of the target information;

(b) accessing, by the electronic device, the AV data to be played back by the electronic device, followed by extracting, by the electronic device, a sample which corresponds to a portion of content of the AV data accessed by the electronic device;

(c) comparing, by the electronic device, the sample thus extracted with the target information received from the advertising broadcast server;

(d) when the sample includes content that matches the target information, transmitting, by the electronic device, a confirmation message to the advertising broadcast server; and (e) receiving, by the electronic device, the advertisement file which corresponds to the target information and which is transmitted by the advertising broadcast server in response to receipt of the confirmation message, and playing back, by the electronic device, the advertisement file thus received.

In a second aspect of the present invention, the method for advertising based on AV content is to be implemented by a system which includes an electronic device and an advertising broadcast server that communicate with each other. The electronic device is provided with an AV playback application program for playback of AV data. The method comprises the steps of:

(A) storing, by the advertising broadcast server, at least one advertisement file and target information corresponding to the advertisement file;

(B) transmitting, by the electronic device, a notification to the advertising broadcast server when the electronic device executes the AV playback application program;

(C) in response to receipt of the notification from the electronic device, transmitting, by the advertising broadcast server, the target information to the electronic device;

(D) accessing, by the electronic device, the AV data to be played back by the electronic device, followed by extracting, by the electronic device, a sample which corresponds to a portion of content of the AV data accessed by the electronic device;

(E) comparing, by the electronic device, the sample thus extracted with the target information received from the advertising broadcast server;

(F) when the sample includes content that matches the target information, transmitting, by the electronic device, a confirmation message to the advertising broadcast server;

(G) in response to receipt of the confirmation message, transmitting, by the advertising broadcast server, the advertisement file corresponding to the target information to the electronic device; and (H) playing back, by the electronic device, the advertisement file received from the advertisement broadcast server.

In a third aspect of the present invention, the method for advertising based on AV content is to be implemented by a client system which includes an electronic device and a cloud server that communicate with each other. The electronic device further communicates with an advertising broadcast server and is provided with an AV playback application program for playback of AV data. The cloud server is provided with a protocol for communication with the advertising broadcast server. The advertising broadcast server stores at least one advertisement file and target information corresponding to the advertisement file. The method comprises the steps of:

(i) receiving, by the cloud server, the target information when the electronic device executes the AV playback application program to notify the advertising broadcast server for transmission of the target information;

(ii) accessing, by the electronic device, the AV data to be played back by the electronic device, followed by extracting, by the electronic device, a sample which corresponds to a portion of content of the AV data accessed by the electronic device;

(iii) transmitting, by the electronic device, the sample thus extracted to the cloud server;

(iv) comparing, by the cloud server, the sample received from the electronic device with the target information received from the advertising broadcast server;

(v) when the sample includes content that matches the target information, transmitting, by the cloud server, a confirmation message to the advertising broadcast server; and (vi) receiving, by the electronic device, the advertisement file which corresponds to the target information and which is transmitted by the advertising broadcast server in response to receipt of the confirmation message, and playing back, by the electronic device, the advertisement file thus received.

In a fourth aspect of the present invention, the method for creating an AV playback APP program is to be implemented by an editing electronic device and an APP creation server. The AV playback APP program is embedded with an advertising broadcast module which enables a client electronic device to communicate with an advertising broadcast server when the client electronic device executes the AV playback APP program for accessing and playing back an AV file. The method comprises the steps of:

storing, by the APP creation server, an APP template and a web page, the APP template including a creator-configurable part, and a non-configurable part that includes the advertising broadcast module, wherein the web page is associated with the creator-configurable part of the APP template;

transmitting, by the editing electronic device, login information to the APP creation server;

in response to receipt and verification of the login information, providing, by the APP creation server, the web page to the editing electronic device, wherein the web page enables input or upload of data by the editing electronic device; and in response to receipt of the data inputted or uploaded by the editing electronic device through the web page, configuring, by the APP creation server, the creator-configurable part of the APP template using the data thus received, and compiling, by the APP creation server, the creator-configurable part and the non-configurable part of the APP template so as to create the AV playback APP program.

An effect of the present invention resides in that, by virtue of extracting the sample from the AV data and comparing the sample with the target information, an advertisement which is relevant to the content of the AV data may be obtained for playback, so as to attract the user and promote the efficiency of the advertisement. Moreover, another effect of the present invention is to provide a convenient means to create an AV playback APP program, such that ordinary people can be APP program editor and publisher, so as to promote the advertising method of the present invention.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
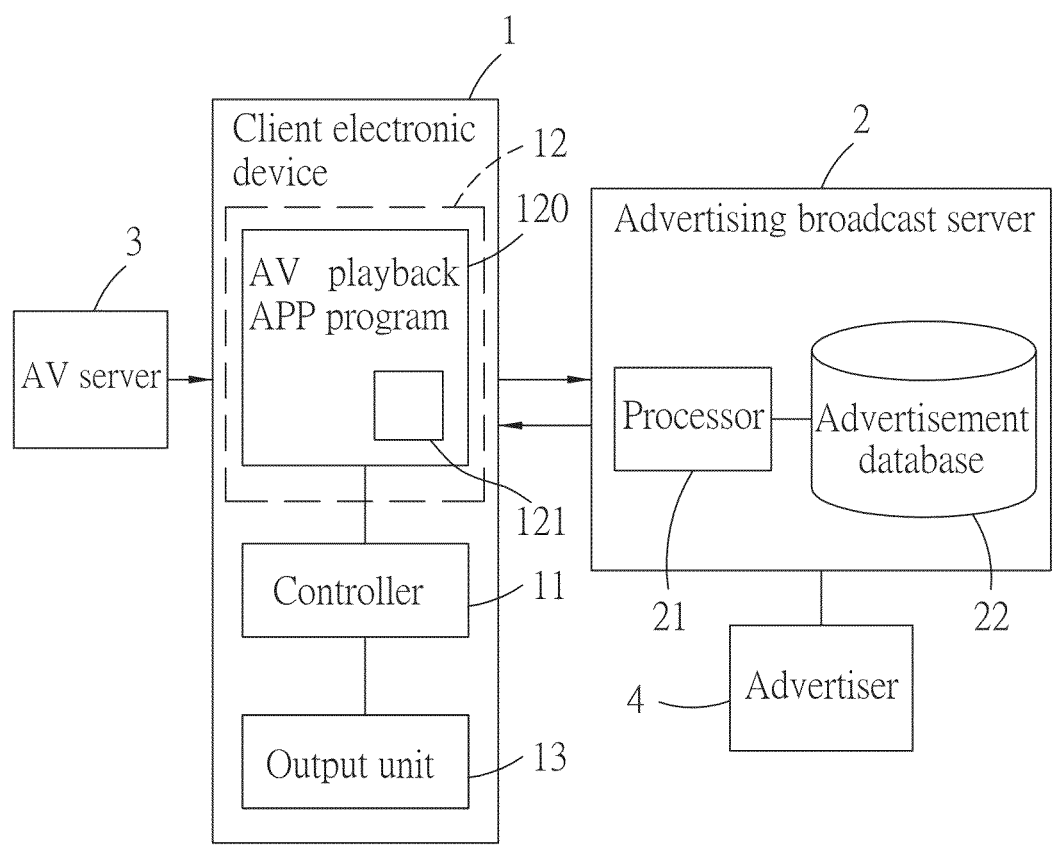
FIG. 1 is a block diagram illustrating a client electronic device and an advertising broadcast server that cooperate to implement a first preferred embodiment of a method for advertising based on audio/video content according to the present invention.

Before the present invention is described in greater detail with reference to the accompanying preferred embodiments, it should be noted herein that like elements are denoted by the same reference numerals throughout the disclosure.

Figure 2:
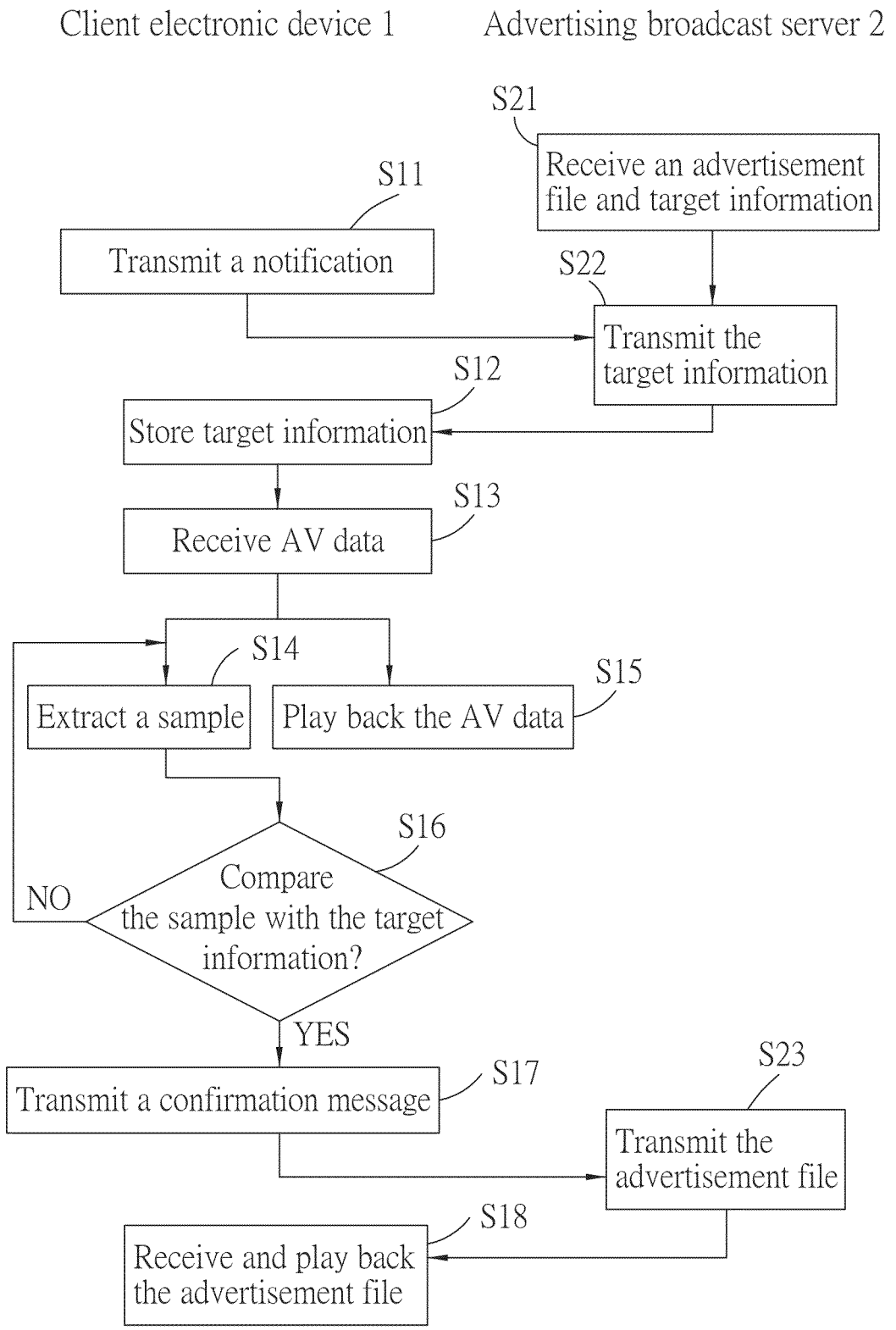
FIG. 2 is a flow chart illustrating the first preferred embodiment of the method for advertising based on audio/video content according to the present invention.

Referring to FIG. 1 and FIG. 2, a first preferred embodiment of a method for advertising based on audio/video (AV) content according to the present invention is illustrated. The method is implemented by a client electronic device 1 in combination with an advertising broadcast server 2. The client electronic device 1 and the advertising broadcast server 2 are defined as a system. However, when the method is carried out in practice, multiple client electronic devices 1 may be connected to the advertising broadcast server 2 at the same time. The client electronic device 1 is a client end, which may be any kind of device, such as a desktop computer, a notebook computer, a tablet computer, a smart television or a smart phone, that is connected to the advertising broadcast server 2 and an AV server 3 for enabling a user to watch video programs. The client electronic device 1 includes a controller 11, a memory 12 connected to the controller 11, and an output unit 13 that includes a display screen and a loudspeaker. The memory 12 is provided with an AV playback application (APP) program 120 for playback of AV data. In this embodiment, the controller 11 executes the AV playback APP program 120, accesses the AV data in a form of packets streaming from the AV server 3, and plays back the AV data thus accessed by means of the output unit 13.

Furthermore, the AV playback APP program 120 is embedded in advance with an advertising broadcast module 121 provided by the advertising broadcast server 2. The advertising broadcast module 121, when the AV playback APP program 120 is executed, configures the client electronic device 1 to communicate with the advertising broadcast server 2, so as to realize data transmission and reception therebetween.

The advertising broadcast server 2 includes a processor 21 and an advertisement database 22. The processor 21 receives from at least one advertiser 4 (only one is shown in FIG. 1) a plurality of advertisement files and multiple entries of target information corresponding respectively to the advertisement files, and stores the advertisement files and the target information in the advertisement database 22. In this embodiment, the target information corresponding to the advertisement file is video information or audio information set by the advertiser 4 based on the advertisement file provided thereby. However, the target information is not limited to the disclosure herein, and may be set by an administrator of the advertising broadcast server 2 based on different rules. For example, when the advertiser 4 provides an advertisement associated with a soft drink and in which a celebrity acts, the target information may be a facial image of the celebrity, an image of a trademark of the advertiser's or competitor's soft drink, a logo of a merchant (e.g., the advertiser 4), an acoustic fingerprint of the celebrity, an acoustic tone of the pronunciation of a name of the soft drink, and so forth. When the advertiser 4 provides an advertisement associated with a car, the target information may be an image of the profile of the car, a partial image, such as an image of a tire, of the car, an image of a logo of the advertiser's or competitor's car, a sound of an engine, a sound of a fast car, and so forth. When the advertiser 4 provides an advertisement associated with a music product, the target information may be a melody of a theme song or an acoustic fingerprint corresponding to the music product, and so forth.

The AV server 3 may be a web server which stores a plurality of entries of AV data to be watched online or to be downloaded. In this embodiment, the AV server 3 transmits the AV data by packet streaming.

The first preferred embodiment of the method for advertising based on AV content according to the present invention comprises the following steps:

In step S11, the client electronic device 1 executes the AV playback APP program 120. In the meantime, the client electronic device 1 is configured by the advertising broadcast module 121 of the AV playback APP program 120 to transmit a notification to the advertising broadcast server 2. It is noted that the advertising broadcast server 2 has completed step S21 in advance, that is, receiving and storing the advertisement files and the target information corresponding to the advertisement files.

In step S22, in response to receipt of the notification from the client electronic device 1, the advertising broadcast server 2 transmits at least one entry of the target information to the client electronic device 1. In this embodiment, image information associated with a logo is given as an example for the target information that is transmitted to the client electronic device 1. In practice, a quantity of the at least one entry of the target information which is selected to be transmitted is configured according to at least one of: a quantity of devices currently being serviced by the advertising broadcast server 2, a parameter associated with performance of the electronic device 1 (e.g., a connection bandwidth therebetween), a quantity of the advertisement files stored in the advertising broadcast server 2, and a size of each entry of the target information. In principle, the amount of target information transmitted to the client electronic device 1 is as more as possible on the premise that the playback of AV data on the client electronic device 1 is not delayed.

In step S12, in response to receipt of the target information from the advertising broadcast server 2, the client electronic device 1 stores the target information in the memory 12 thereof.

In step S13, the client electronic device 1 connects to the AV server 3, and accesses one entry of the AV data stored in the AV server 3, that is, receiving a packet stream associated with said entry of the AV data from the AV server 3. The client electronic device 1 subsequently stores the packet stream associated with the AV data thus accessed in the memory 12.

In step S14, the client electronic device 1 extracts a sample which corresponds to a portion of content of the AV data stored in the memory 12. In this embodiment, extraction of a sequence of image frames from the AV data stored in the memory 12 is given as an example for the extraction of the sample, and each of the image frames is an extracted sample. However, the present invention is not limited to the disclosure herein, and the sample may be a portion of the image frame, or an audio segment. This step may be implemented by merely extracting an image frame, an audio segment, or both the image frame and the audio segment.

It is noted that even if receipt of the packet streaming associated with the AV data and extraction of the sample from the AV data are given as an example in the embodiment, the present invention is not limited to the aforementioned operations. In step S13, the client electronic device 1 may access AV data which has been downloaded and stored in advance in the memory 12 thereof, or alternatively, may access AV data which is stored in a storage medium (such as a compact disc) that is readable by the client electronic device 1. In step S14, the client electronic device 1 may extract a sample from the AV data accessed in step S13.

In step S15, which may be performed simultaneously with step S14, the client electronic device 1 plays back the packet stream associated with the AV data stored in the memory 12, that is, playing back the AV data via the output unit 13 thereof.

In step S16, subsequent to step S14, the client electronic device 1 compares the sample thus extracted with the target information received from the advertising broadcast server 2, i.e., to compare each of the image frames extracted in step S14 with the target information. Specifically, the client electronic device 1 may perform image recognition technology to determine whether the sample (each of the image frames) includes content that matches the target information. When the sample includes the content matching the target information, the flow goes to step S17. Otherwise, the flow goes back to step S14 wherein the client electronic device 1 continues to extract a sample from the received packet stream. It is noted that, if the target information is audio information, the sample extracted by the client electronic device 1 is an audio segment, and the comparison made in step S16 is to perform audio recognition so as to determine whether the sample includes content that matches the target information.

In step S17, the client electronic device 1 transmits a confirmation message to the advertising broadcast server 2 when the sample includes the content that matches the target information. The confirmation message usually represents that the AV data which is being played back is relevant to the advertisement file which was provided by the advertiser 4.

In step S23, in response to receipt of the confirmation message, the advertising broadcast server 2 transmits at least one of the advertisement files corresponding to the target information to the client electronic device 1.

In step S18, the client electronic device 1 receives the at least one of the advertisement files from the advertising broadcast server 2, and plays back the advertisement file via the output unit 13. The advertisement file may be outputted in a form of text, an image, a video, or an audio, and is not limited to any specific manner. For example, in an interface of the AV playback APP program 120, text message is displayed in a manner of a marquee, an image, a motion picture or a video pops in a new window, audio is played back, and so forth.

Figure 3:
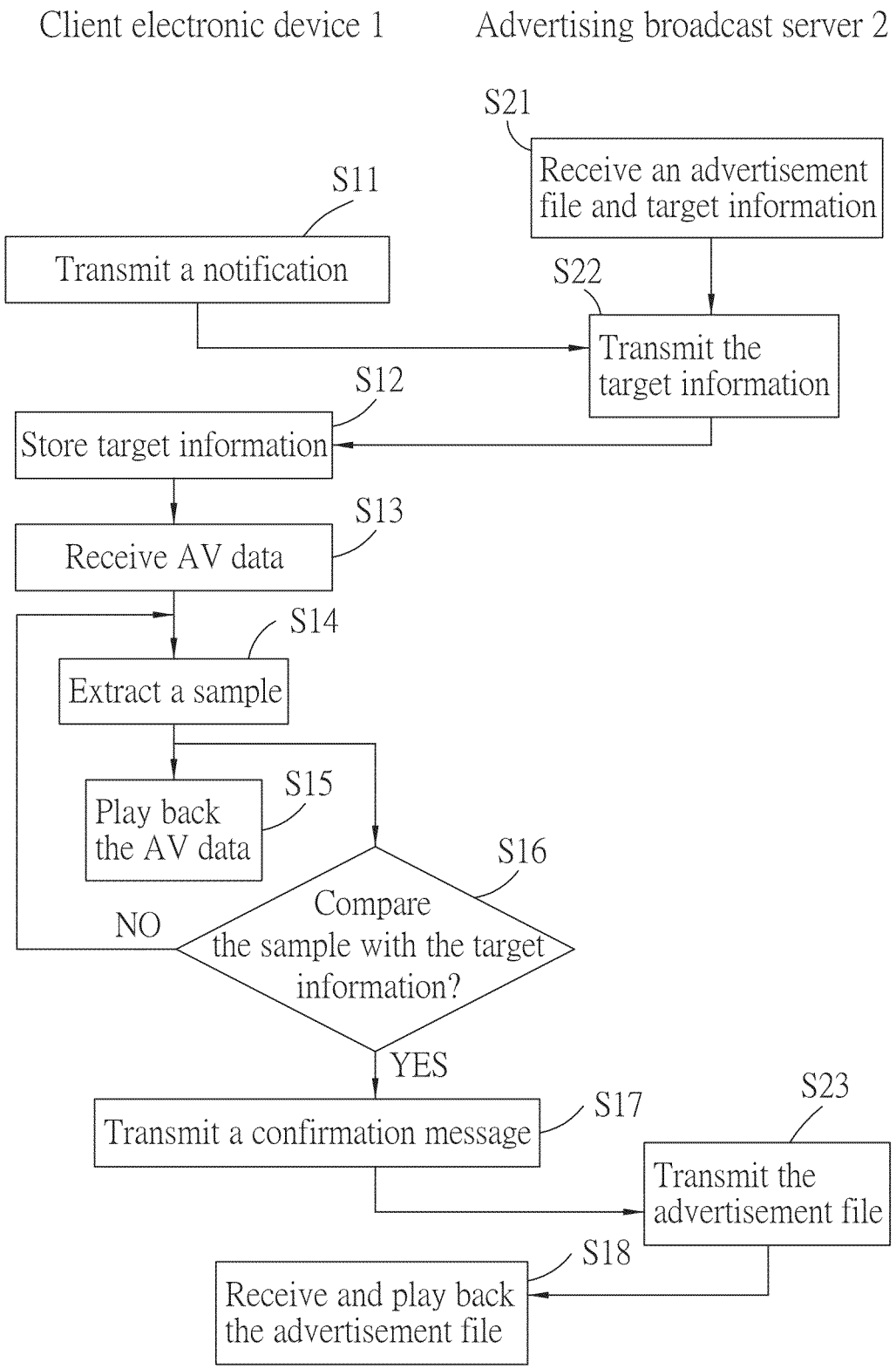
FIG. 3 and FIG. 4 are flow charts each of which illustrates a variation of the first preferred embodiment.
Figure 4:
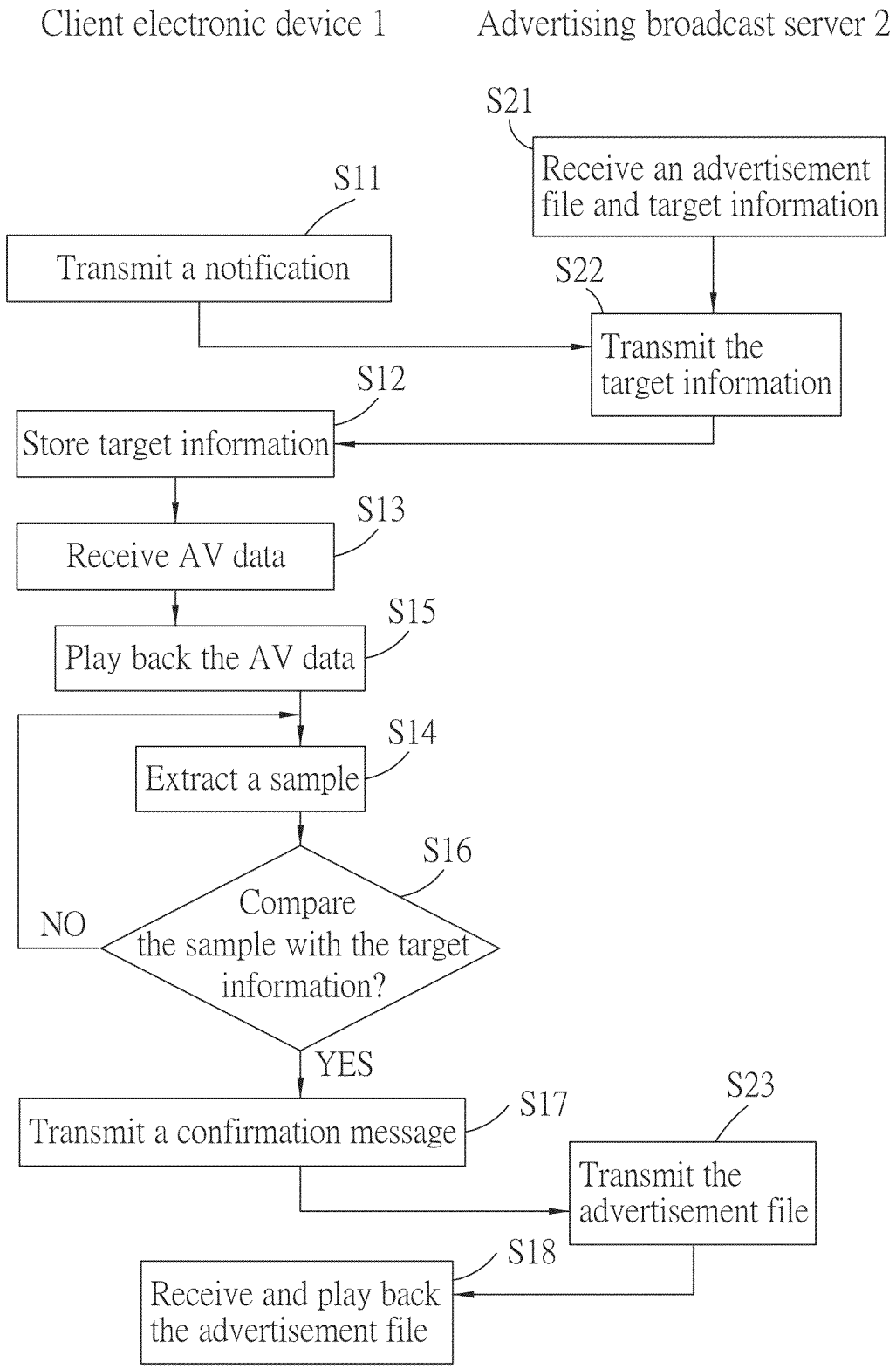

Steps S14 and S15 are exemplified as being performed simultaneously. However, the present invention is not limited to this configuration. Steps S14 and S15 may be performed in sequence as illustrated in FIG. 3 or FIG. 4. Referring to FIG. 3, in a first variation of the first preferred embodiment, the client electronic device 1 first performs step S14, in which the client electronic device 1 extracts the sample from the packet stream received thereby, followed by step S16, in which the client electronic device 1 compares the sample with the target information. Moreover, subsequent to step S14, the client electronic device 1 further performs step S15, in which the client electronic device 1 temporarily stores the packet stream after the sample extraction operation and then plays back the packet stream.

Referring to FIG. 4, in a second variation of the first preferred embodiment, the client electronic device 1 first performs step S15, in which the client electronic device 1 temporarily stores the packet stream and then plays back the packet stream, followed by step S14, in which the client electronic device 1 extracts the sample from the packet stream thus temporarily stored, and subsequently performs step S16, in which the client electronic device 1 compares the sample with the target information.

Furthermore, for the purpose of promoting an exposure rate and a usage rate of the AV playback APP program 120 so that the AV playback APP program 120 may be downloaded by a massive amount of client electronic devices 1, a method for creating an AV playback APP program according to the present invention is illustrated. The AV playback APP program 120 of the aforementioned preferred embodiment is created by an editing electronic device 5 and an APP creation server 6 as illustrated in FIG. 5 which cooperate to perform a preferred embodiment of the method for creating the AV playback APP program according to the present invention as illustrated in FIG. 6.

Figure 5:
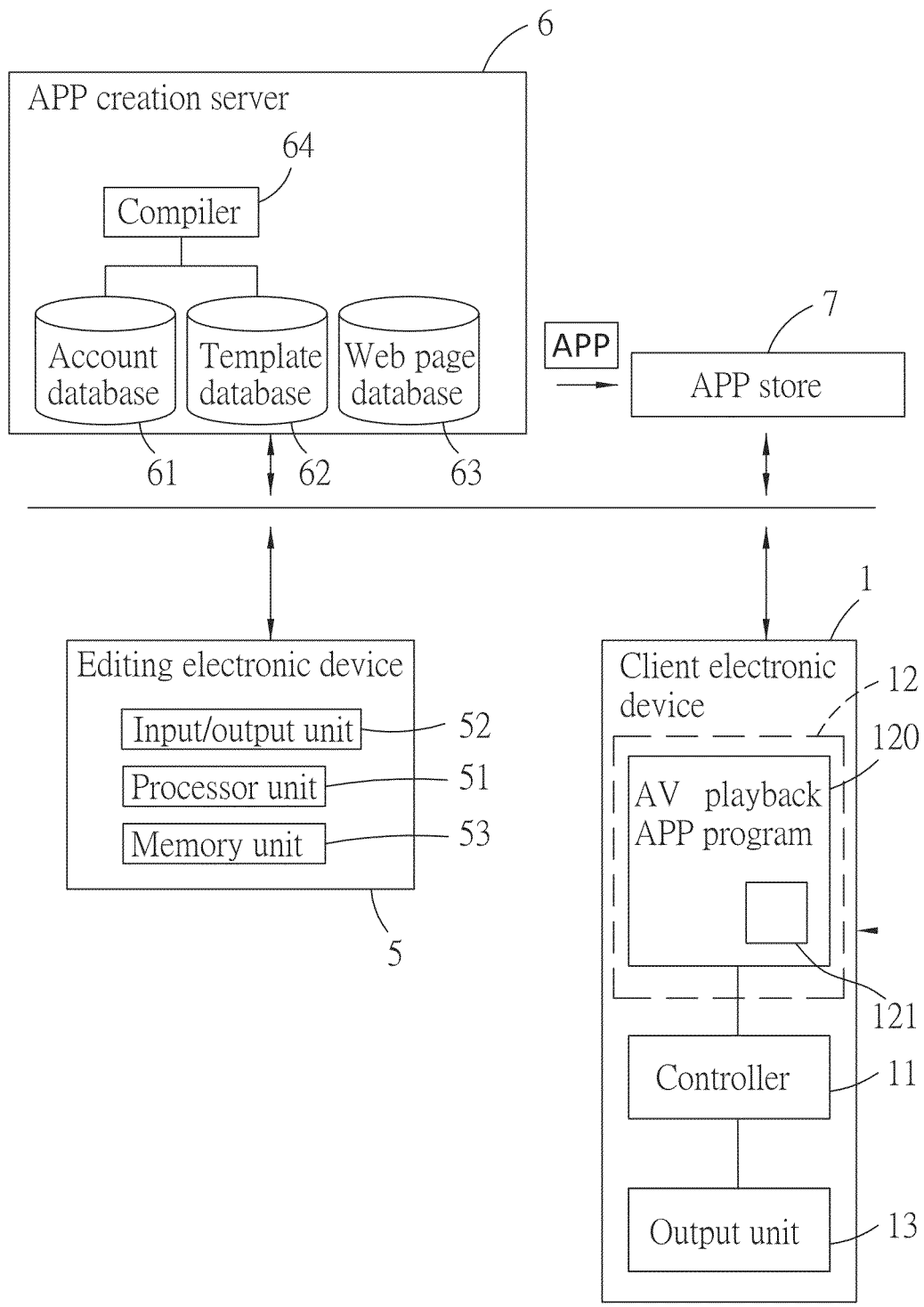
FIG. 5 is a block diagram illustrating an editing electronic device and an application (APP) creation server that cooperate to implement a method for creating an audio/video playback APP program according to the present invention.
Figure 6:
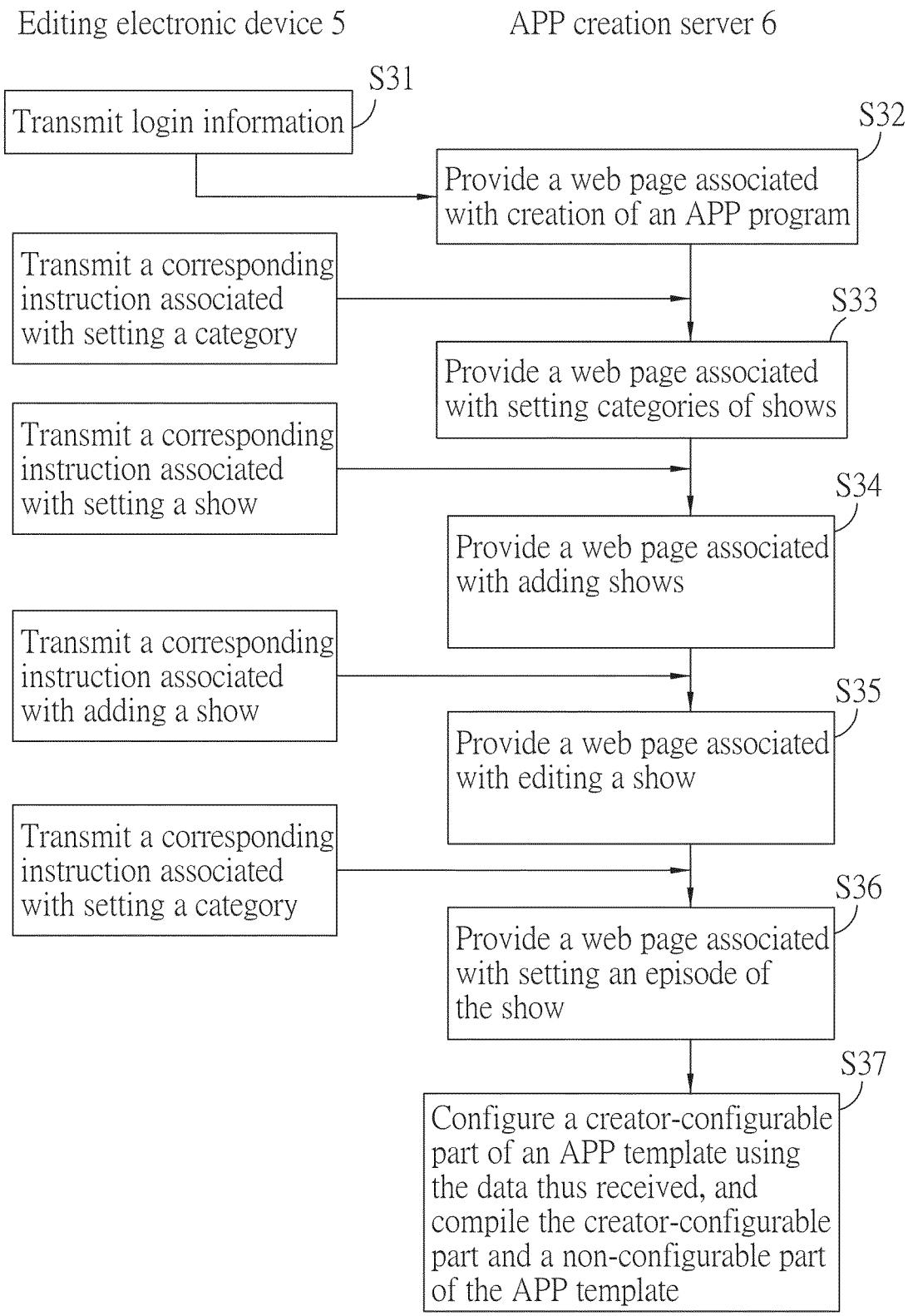
FIG. 6 is a flow chart illustrating a preferred embodiment of the method for creating an audio/video playback APP program according to the present invention.

Referring to FIG. 5, the editing electronic device 5, which is one of a desktop computer, a notebook computer, a tablet computer, a smart television and a smart phone of a program editor, communicates with the APP creation server 6, and includes a processor unit 51, an input/output unit 52, and a memory unit 53 (or a register) that stores at least one link (e.g., a web address) linking to AV data. The program editor, by means of the editing electronic device 5, may collect and store web pages linking to the AV data in the memory unit 53. For example, an internet user (i.e., the program editor) who is interested in cooking gathers a plurality of cooking-related videos on respective web pages, and stores web addresses linking to the cooking-related videos, image links, and corresponding introductions (referred to as program introductions hereinafter) according to a logic sequence arranged by the program editor. An internet user (i.e., the program editor) who is interested in mathematics teaching gathers a plurality of teaching videos on respective web pages, and stores web addresses linking to the teaching videos, image links, and program introductions according to a logic sequence arranged by the program editor. Moreover, an entertainment corporation (i.e., the program editor) makes at least one music video for an artist, and sets a web address linking to the music video, an image link and a program introduction associated with the music video. Since the program editors wish that a great amount of internet surfers may watch the AV data edited thereby, if an APP program associated with the AV data is created to be downloaded and executed conveniently by the internet surfers, it would be beneficial to fulfill their wishes. However, for most program editors, they lack a tool for creating the APP program associated with the AV data.

The APP creation server 6 of the present invention provides the program editor with a convenient APP development tool. The APP creation server 6 may upload an APP created thereby to an APP store 7 to be downloaded by the internet surfers.

The APP creation server 6 includes an account database 61 which is configured to store AV data, such as a link or an introduction, uploaded by each account, a template database 62 which stores at least one APP template, a web page database 63 which stores at least one web page, and a compiler 64. The APP template includes a creator-configurable part, and a non-configurable part that includes the advertising broadcast module 121 (see FIG. 1). The web page is associated with the creator-configurable part of the APP template. The web page enables input or upload of data by the editing electronic device 5 operated by the program editor.

The editing electronic device 5 and the APP creation server 6 cooperate to implement the method for creating the aforementioned AV data playback APP program 120. The method comprises the following steps.

In step S31, the editing electronic device 5 transmits login information to the APP creation server 6 so as to initiate a procedure for creating an APP program by an account. It is noted that for each account, at least one APP program may be created. Each APP program may include at least one show, and each show may include at least one episode.

Figure 7:
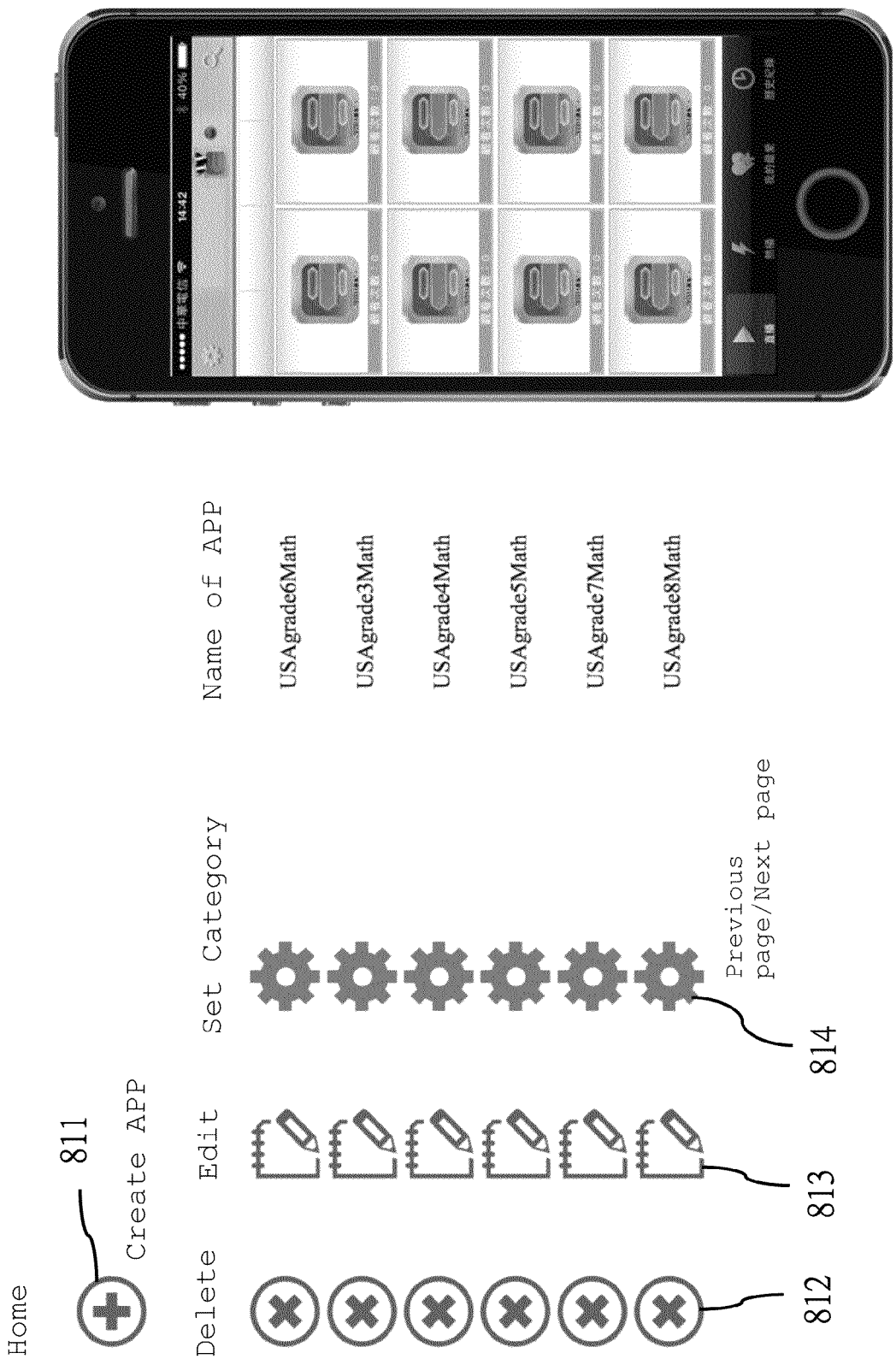
FIG. 7 to FIG. 13 illustrate user interfaces of web pages provided by the APP creation server to the editing electronic device.

In step S32, in response to receipt and verification of the login information, the APP creation server 6 provides a web page (illustrated in FIG. 7) which is associated with creation of an APP program to the editing electronic device 5. The web page includes a button 811 of "Create APP", and if there exists a previously created APP program, the web page further includes a button 812 of "Delete", a button 813 of "Edit", and a button 814 of "Set Category" associated with the previously created APP program. In FIG. 7, six previously created APP programs are illustrated. The editing electronic device 5 transmits a corresponding instruction to the APP creation server 6 when the program editor triggers the button 814 of "Set Category" of one of the previously created APP programs.

Figure 8:
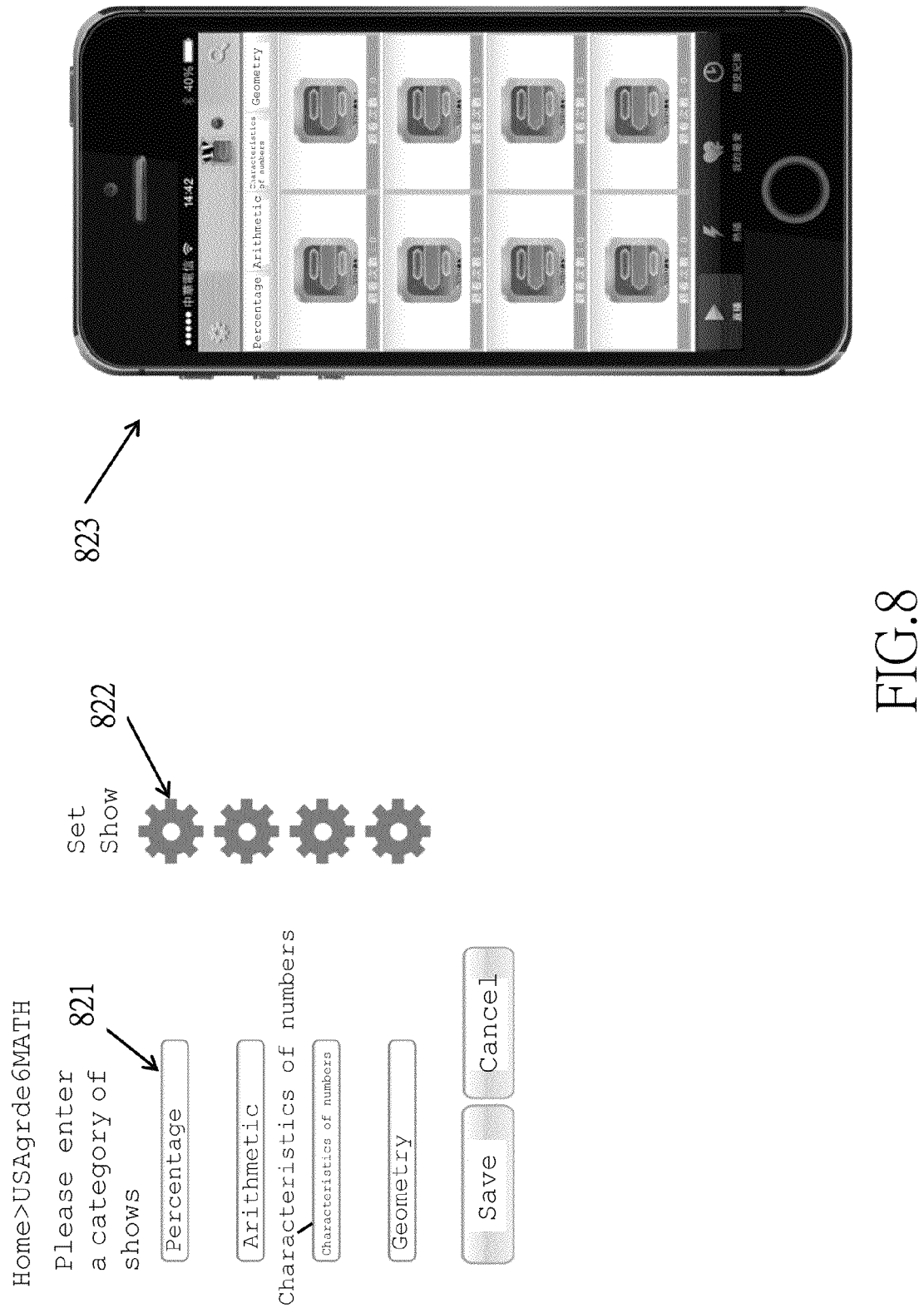

In step S33, in response to receipt of the corresponding instruction associated with setting a category, the APP creation server 6 provides a web page (illustrated in FIG. 8) which is associated with setting categories of shows for the previously created APP program to the editing electronic device 5. The web page includes at least one input field 821 for input of the category of the shows, a button 822 of "Set Show" for each category, and a preview image 823 which simulates an interface of the previously created APP program when the previously created APP program is downloaded and installed in the client electronic device 1. When a category is inputted into the input field 821, the preview image 823 represents a tab for the category thus inputted. The editing electronic device 5 transmits a corresponding instruction to the APP creation server 6 when the program editor triggers the button 822 of "Set Show" of one of the categories for the previously created APP program.

Figure 9:
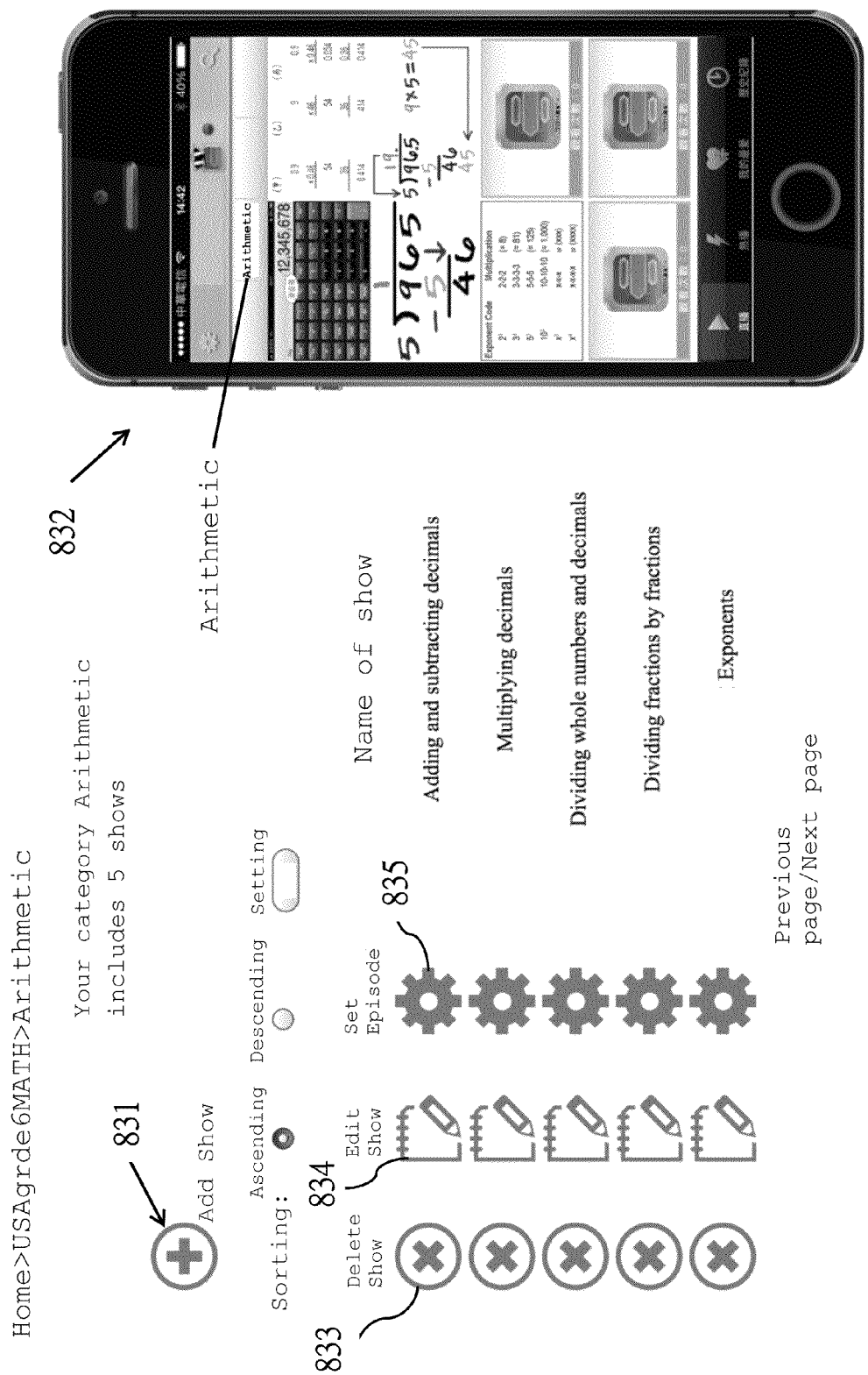

In step S34, in response to receipt of the corresponding instruction associated with setting a show, the APP creation server 6 provides a web page (illustrated in FIG. 9) which is associated with adding shows to said one of the categories to the editing electronic device 5. The web page includes a button 831 of "Add Show", a list of shows if there exist the shows which have been added, and a preview image 832. The list includes a button 833 of "Delete Show", a button 834 of "Edit Show", and a button 835 of "Set Episode" for each of the shows that have been added. In a condition that shows have been added, the preview image 832 represents corresponding images of the shows. In FIG. 9, five corresponding images of five shows that have been added are given as an example in the preview screen 832. The editing electronic device 5 transmits a corresponding instruction to the APP creation server 6 when the program editor triggers the button 831 of "Add Show".

In step S35, in response to receipt of the corresponding instruction associated with adding a show, the APP creation server 6 provides a web page (illustrated in FIG. 10) which is associated with editing a show that is to be added to the editing electronic device 5. The web page includes an input field 841 for input of a name of the show to be added, an input field 842 for input of an introduction of the show to be added, an input field 843 for input of a link to an image, an input field 844 for input of a source link with the introduction, and a preview image 845.

Figure 10:
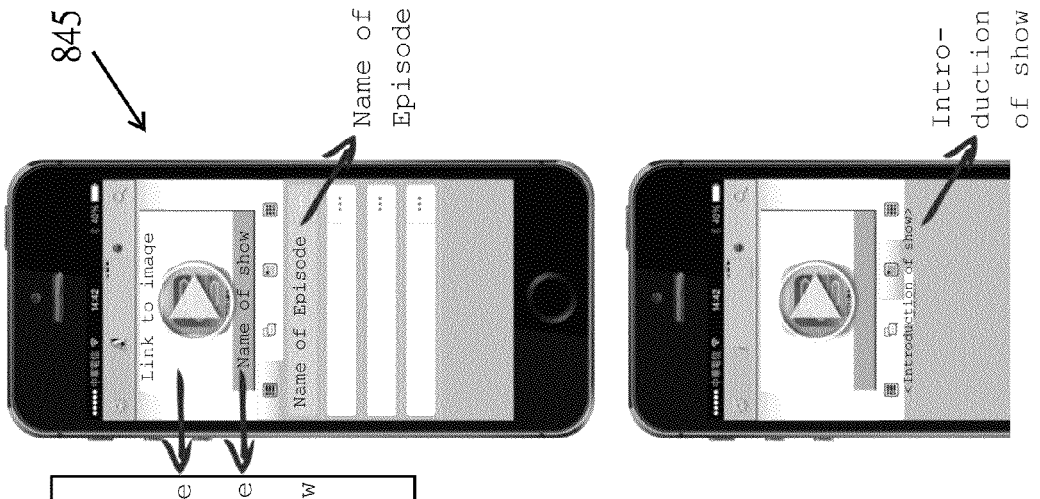
Figure 11:

When the button 834 of "Edit Show" in the web page illustrated in FIG. 9 is triggered, or when the input fields 841 to 844 in the web page illustrated in FIG. 10 are filled and saved, a user interface of a web page illustrated in FIG. 11 is provided. In this web page, the link to the image has been accessed by the APP creation server 6, so that the image linked thereby is represented in a primary display area of the preview image 845. The name of the show which has been filled in the input field 841 is represented at a position under the image or other suitable location in the preview image 845. The introduction of the show which has been filled in the input field 842 is presented in one of tabs of an interface of the APP program thus created.

Figure 12:
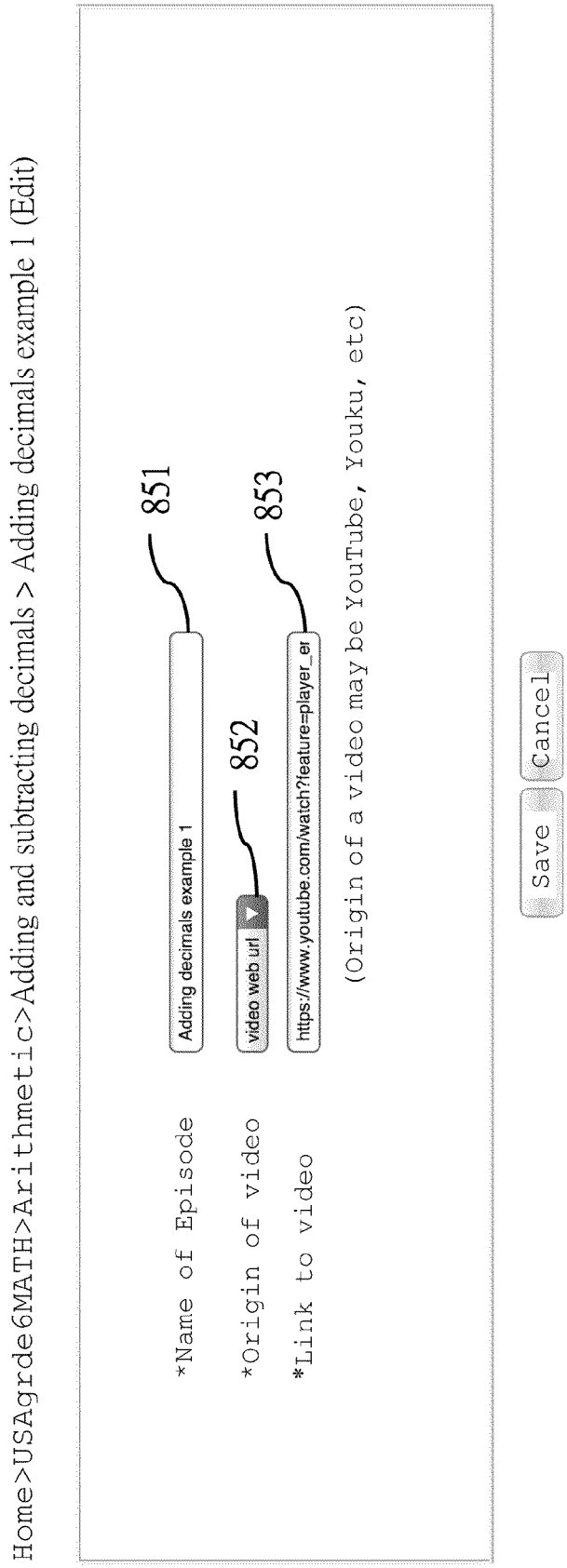
Figure 13:
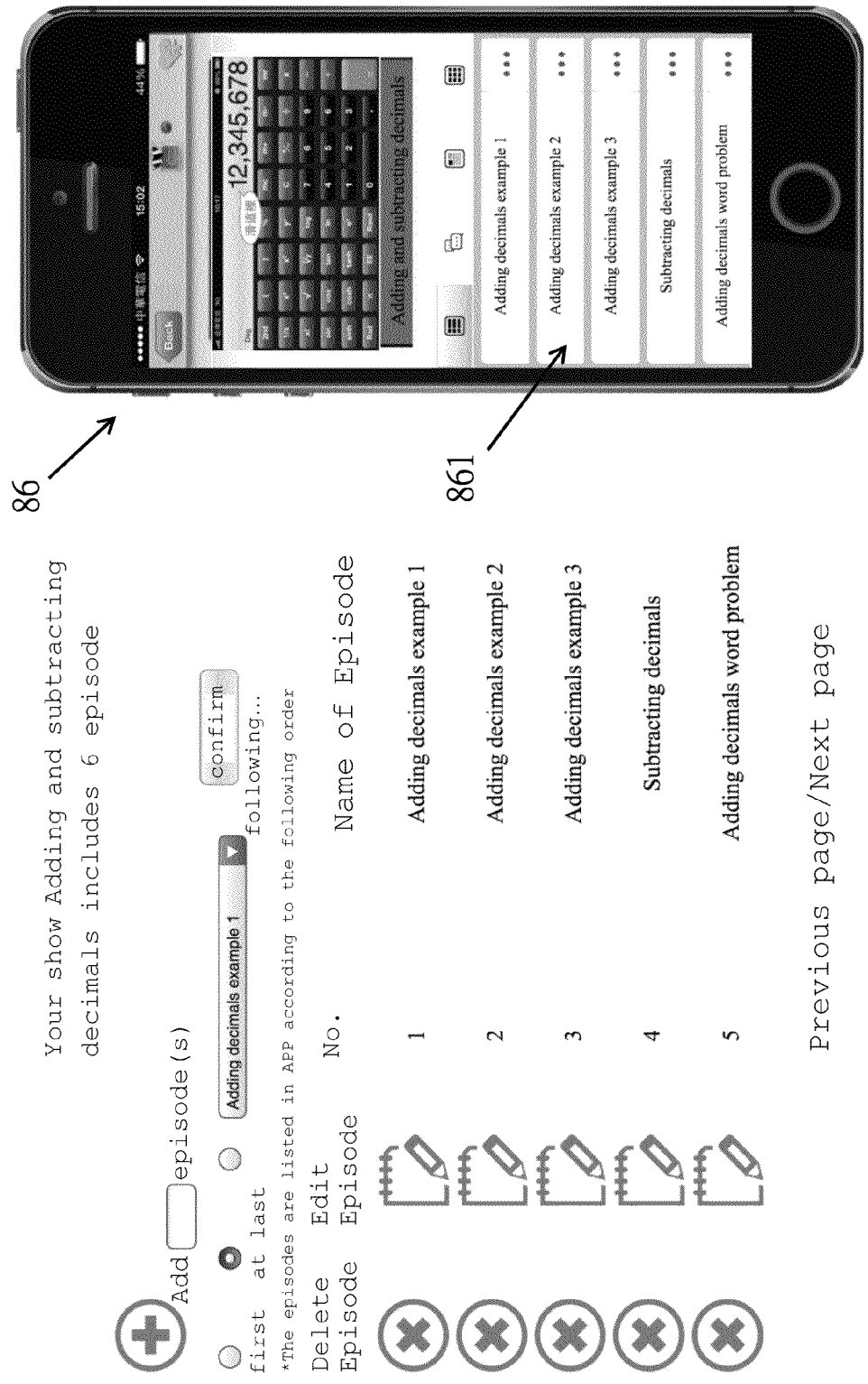

In step S36, when the button 835 of "Set Episode" in the list of the shows that have been added is triggered by the program editor, the editing electronic device 5 transmits a corresponding instruction to the APP creation server 6. In response to receipt of the corresponding instruction associated with setting an episode, the APP creation server 6 provides a web page (illustrated in FIG. 12) which is associated with setting an episode of the show to the editing electronic device 5. The web page includes an input field 851 for input of a name of the episode to be set, a pull down menu 852 for selecting a source of a video of the episode, and an input field 853 for input of a link to the video of the episode. After the episode has been set, a web page illustrated in FIG. 13 is provided. The web page includes a preview screen 86 which contains at least a list of episodes 861. The episode which has been set may be further edited in this web page.

The aforementioned web pages in steps S31 to S36 provided by the APP creation server 6 are all retrieved from the web page database 63. The APP creation server 6, after receiving the data inputted or uploaded by the account of the program editor, stores the data in the account database 61.

In step 37, the APP creation server 6 configures the creator-configurable part of the APP template stored in the template database 62 using the data thus received and stored in the account database 61, and compiles the creator-configurable part and the non-configurable part of the APP template by the compiler 64 so as to create the AV playback APP program 120. The APP creation server 6 subsequently uploads the AV playback APP program 120 to the APP store 7 to be displayed thereon. The AV playback APP program 120 may also be uploaded to a web site for download by a user.

After the APP program (i.e., the AV playback APP program 120) has been downloaded, installed and executed by the client electronic device 1, when the user selects one of the names of the episodes in the list 861, the client electronic device 1 immediately connects to the source of the video of the episode based on the link filled in the input field 853 and starts to play back the video of the episode. At the same time, the method for advertising based on AV content according to the present invention may also be performed. Furthermore, when the program editor utilizes the APP creation server 6 to update content of the APP program, for example, adding a new episode, the client electronic device 1 which downloads and installs the AV playback APP program 120 is able to play back the new episode directly. When the APP creation server 6 updates the APP template or the compiler 64, the AV playback APP program 120 is compiled anew and is uploaded once again to the APP store 7, and the APP store 7 automatically notifies the user of the update.

It is noted that the web pages shown in FIG. 7 to FIG. 13 are merely exemplary instances for explaining the steps of the method for creating the AV playback APP program as illustrated in FIG. 6. In practical implementation, the web pages may be represented in a different fashion, and design of the web pages should not be limited to the disclosures in FIG. 7 to FIG. 13.

Figure 14:
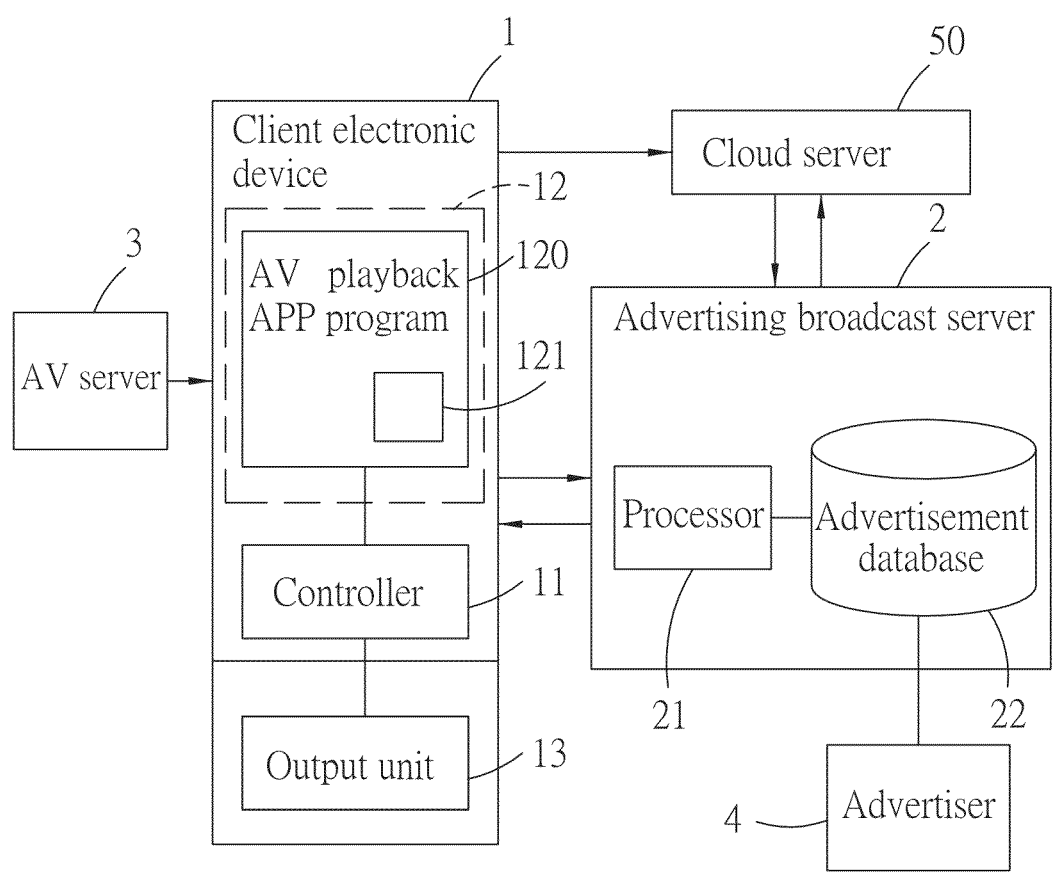
FIG. 14 is a block diagram illustrating a client electronic device, a cloud server and an advertising broadcast server that cooperate to implement a second preferred embodiment of the method for advertising based on audio/video content according to the present invention.
Figure 15:
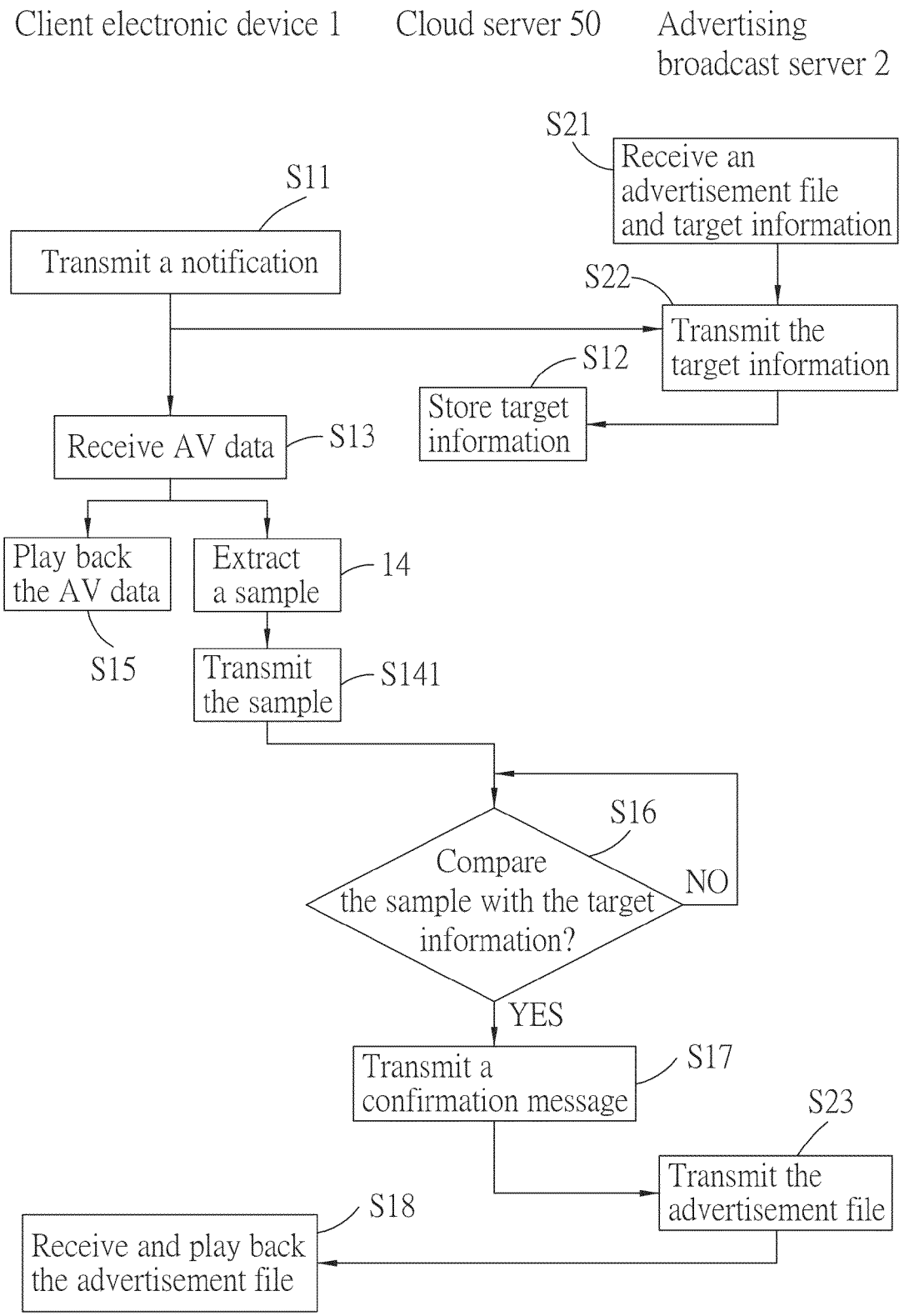
FIG. 15 is a flow chart illustrating the second preferred embodiment of the method for advertising based on audio/video content according to the present invention.

Referring to FIG. 14 and FIG. 15, a second preferred embodiment of the method for advertising based on AV content according to the present invention is illustrated. The second preferred embodiment is similar to the first preferred embodiment, and differs from the first preferred embodiment in that the method is to be implemented cooperatively by a client electronic device 1 in combination with an advertising broadcast server 2 and a cloud server 50. The client electronic device 1 and the cloud server 50 that communicate with each other jointly define a client system, and the cloud server 50 is provided with a protocol (an application program, not shown) for communication with the advertising broadcast server 2. The cloud server 50 is provided to perform parts of the operations which are originally performed by the client electronic device 1 in the method of the first preferred embodiment.

Specifically, the step S12 of "in response to receipt of the target information from the advertising broadcast server 2, storing the target information" which is originally performed by the client electronic device 1 in the first preferred embodiment, is configured to be performed by the cloud server 50 in the second preferred embodiment. In step S11, when the client electronic device 1 executes the AV playback APP program 120, the client electronic device 1 is also configured by the advertising broadcast module 121 of the AV playback APP program 120 to transmit a notification to the advertising broadcast server 2. However, in step S22, the advertising broadcast server 2 transmits the target information to the cloud server 50, instead of the client electronic device 1. In addition, after the client electronic device 1 extracts the sample from the AV data in step S14, the client electronic device 1 is further configured by the advertising broadcast module 121 to perform step S141, that is, transmitting the sample thus extracted to the cloud server 50. Accordingly, in step S16, the cloud server 50 is able to compare the sample received from the client electronic device 1 with the target information received from the advertising broadcast server 2. In step S17, when the sample includes content that matches the target information, the cloud server 50 transmits a confirmation message to the advertising broadcast server 2. The advertising broadcast server 2 subsequently transmits the advertisement file to the client electronic device 1 for playback thereby.

Figure 16:
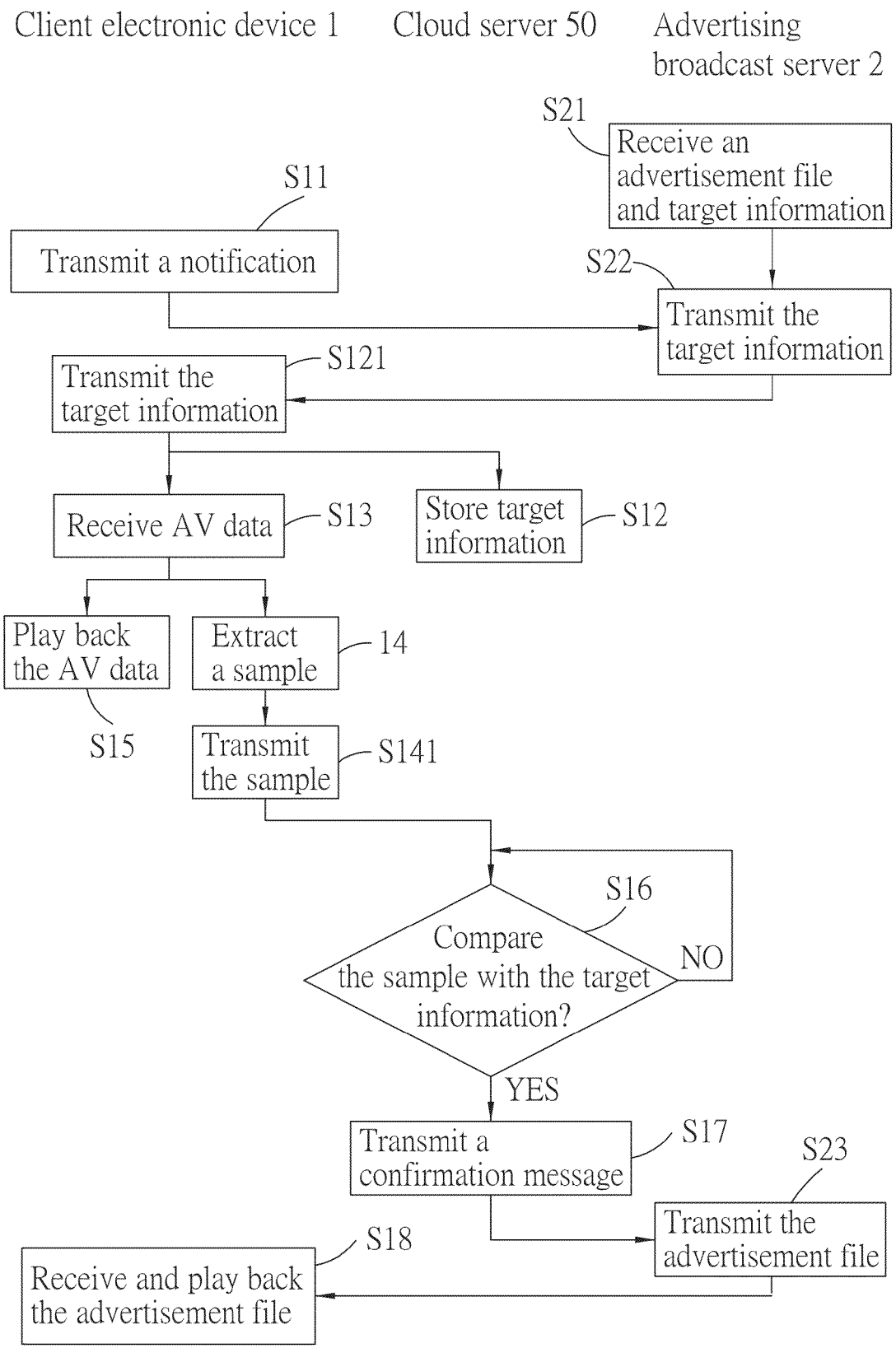
FIG. 16 is a flow chart illustrating a variation of the second preferred embodiment.

Referring to FIG. 16, a variation of the second preferred embodiment is illustrated. In step S22 of this variation, in response to receipt of the notification from the client electronic device 1, the advertising broadcast server 2 transmits the target information to the client electronic device 1. Moreover, the client electronic device 1 is further configured to perform step S121, in which the electronic device transmits the target information that is received from the advertising broadcast server 2 to the cloud server 50. Therefore, in step S12, the cloud server 50 receives the target information from the client electronic device 1, instead of the advertising broadcast server 2, and then stores the target information for subsequent comparison operation in step S16.

To sum up, the method for advertising based on AV content according to the present invention, by means of the AV playback APP program 120 executed by the client electronic device 1, includes the steps of extracting the sample from the AV data and comparing the sample with the target information, such that a relevant advertisement may be sifted out for playback, so as to effectively attract the user and promote the effect of the advertisement.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for advertising based on audio/video (AV) content, the method to be implemented by a client system which includes an electronic device and a cloud server that communicate with each other, the electronic device further communicating with an advertising broadcast server and being provided with an AV playback application program for playback of AV data, the cloud server being provided with a protocol for communication with the advertising broadcast server, the advertising broadcast server storing at least one advertisement file and target information corresponding to the advertisement file, the method comprising the steps of:
   (i) receiving, by the cloud server, the target information when the electronic device executes the AV playback application program to notify the advertising broadcast server for transmission of the target information;
   (ii) accessing, by the electronic device, the AV data to be played back by the electronic device, followed by extracting, by the electronic device, a sample which corresponds to a portion of content of the AV data accessed by the electronic device;
   (iii) transmitting, by the electronic device, the sample thus extracted to the cloud server;
   (iv) comparing, by the cloud server, the sample received from the electronic device with the target information received from the advertising broadcast server;
   (v) when the sample includes content that matches the target information, transmitting, by the cloud server, a confirmation message to the advertising broadcast server; and
   (vi) receiving, by the electronic device, the advertisement file which corresponds to the target information and which is transmitted by the advertising broadcast server in response to receipt of the confirmation message, and playing back, by the electronic device, the advertisement file thus received wherein step (i) includes the sub-steps of:
   receiving, by the electronic device, the target information from the advertising broadcast server when the electronic device notifies the advertising broadcast server for transmission of the target information, and transmitting, by the electronic device, the target information to the cloud server; and
   receiving, by the cloud server, the target information from the electronic device.

2. The method as claimed in claim 1, wherein the target information is image information, the sample extracted by the electronic device is an image frame or a portion of the image frame, and the comparison made in step (iv) is to perform image recognition.

3. The method as claimed in claim 1, wherein the target information is audio information, the sample extracted by the electronic device is an audio segment, and the comparison made in step (iv) is to perform audio recognition.

* * * * *